May 21, 1940.   E. N. YANTES   2,201,280
SEAT RECOIL CHECK
Filed June 10, 1938   2 Sheets-Sheet 2
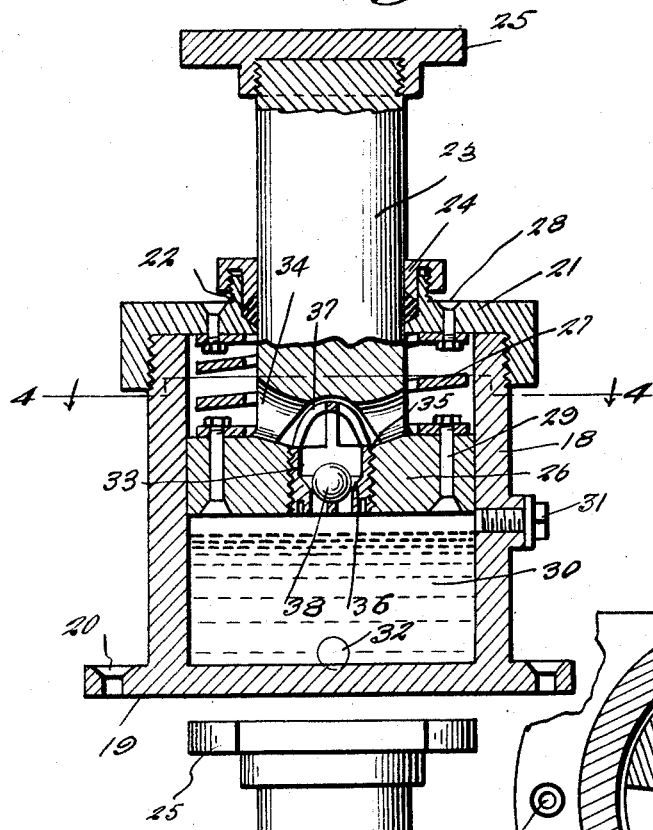
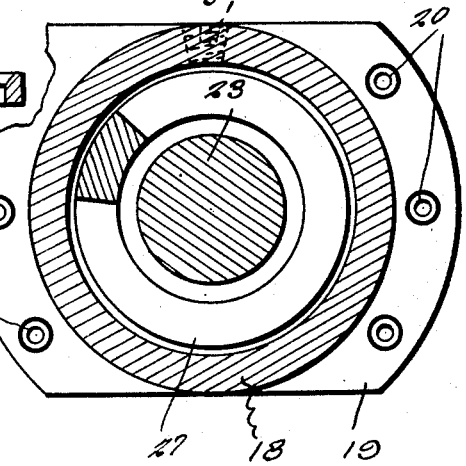
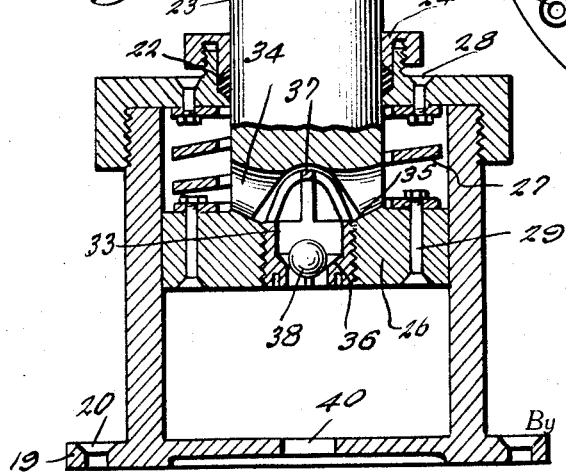
Inventor
E. N. Yantes
By Clarence A. O'Brien
and Hyman Berman
Attorneys Patented May 21, 1940

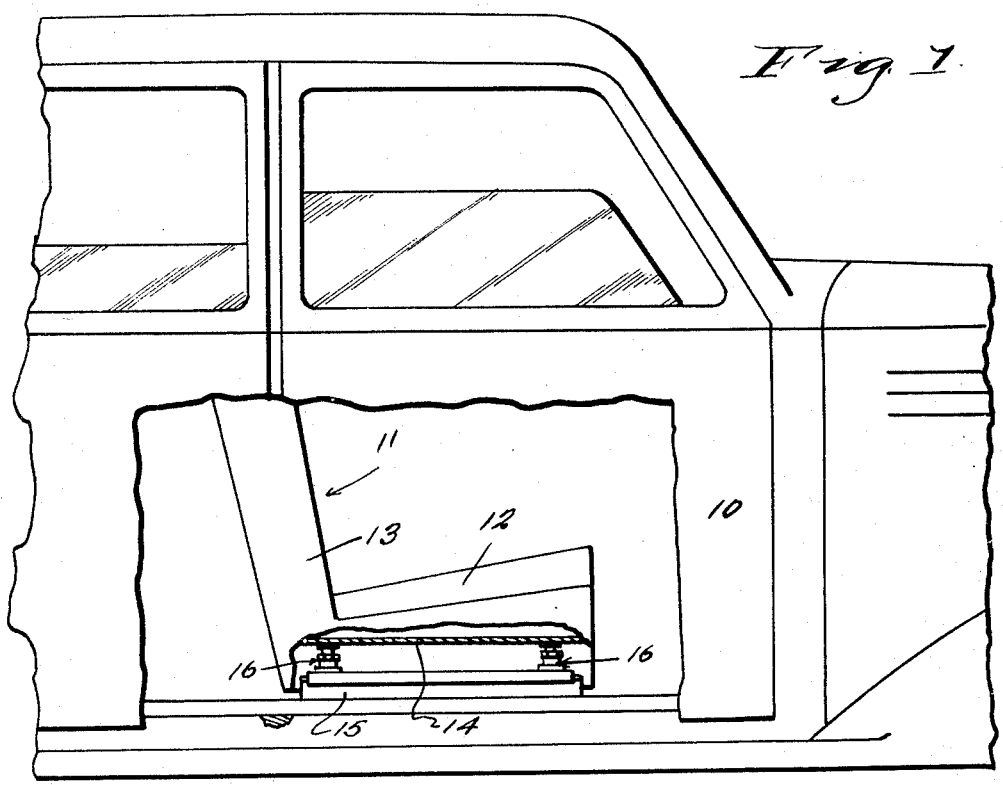
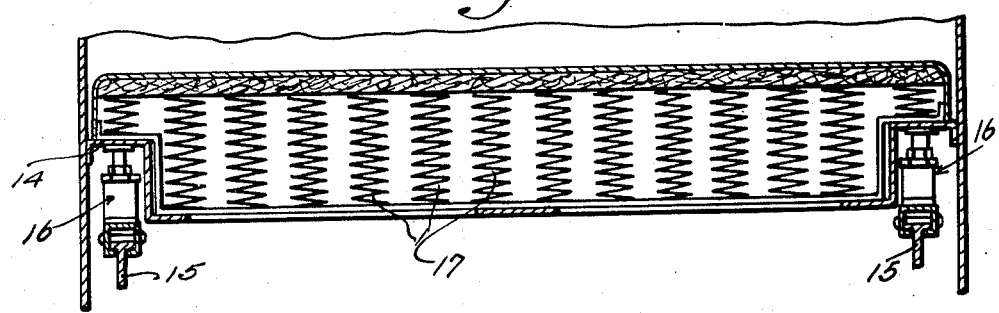

2,201,280

UNITED STATES PATENT OFFICE 2,201,280

SEAT RECOIL CHECK

Edmond N. Yantes, Melbourne, Fla.

Application June 10, 1938, Serial No. 213,021

1 Claim. (Cl. 267—8)

This invention relates to seat recoil checks for all types of motor vehicles, Pullman cars, aeroplanes and speedboats if desired and has for the primary object the provision of a device of this character which will absorb shocks that otherwise would be transmitted through the vehicle seat to the occupant of said vehicle, thus greatly increasing the riding comfort for the occupant.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a motor vehicle body and a seat thereof equipped with seat recoil checks constructed in accordance with the present invention.

Figure 2 is a fragmentary longitudinal sectional view showing the recoil checks connected to the seat and to the track on which the seat is movably mounted.

Figure 3 is a vertical sectional view illustrating one of the recoil checks.

Figure 4 is a sectional view taken on line 4—4 of Figure 3.

Figure 5 is an end view illustrating a valve and its cage.

Figure 6 is a vertical sectional view illustrating a modified form of my invention.

In the following detailed description, the present invention will be described in conjunction with a motor vehicle. However, it is to be understood that the present invention is readily adaptable to any other type of vehicle, boat, aeroplane or Pullman car without departing from the present invention.

Referring in detail to the drawings, the numeral 10 indicates a fragmentary portion of a motor vehicle body and 11 the passenger seat thereof. The seat 11 is of a conventional construction having a removable cushion seat 12 and a back 13 which includes a cushion frame 14 in which the seat cushion 12 is removably mounted. In present-day motor vehicle construction it is customary that the seat 11 be mounted in the vehicle body for adjustment forwardly and backwardly of the body by being slidably mounted on tracks 15 and equipped with a suitable locking means (not shown) for securing the seat in any of its adjusted positions. To adapt the present invention to a seat construction of the character described, the units 16 are slidably mounted on the tracks 16 in any well known manner and are detachably mounted on the seat frame 14. The units 16 provide for the seat 11 recoil checks to absorb shocks ordinarily transmitted to the occupants of the seat 11 through the springs 17 of the seat cushion 12.

While the units 16 have been described as being associated with the tracks 15 it is to be understood that the units may be rigidly secured on the floor of the vehicle, for instance, in buses, motor trucks, Pullman cars, aeroplanes and like vehicles. The units may be mounted directly on the floor of the vehicle.

Each unit 16 consists of a cylinder 18 having a marginal flange 19 at the bottom thereof equipped with openings 20 to receive bolts or like fasteners for the mounting of the cylinder on the vehicle. The upper end of the cylinder is fully open and externally screw threaded and has threaded thereon a cap 21 having a packing gland 22 to slidably receive a stem 23. The packing gland includes an adjusting nut or sleeve 24 threaded on the cap 21 for adjusting the packing of the gland against the stem 23 and to permit the removal and replacement of the packing when desired. The upper end of the stem 23 has detachably secured thereon a fitting or attaching plate 25 to permit the connecting of the stem 23 onto a seat frame.

Formed integrally with the stem 23 and operating in the cylinder 18 is a piston 26. The piston 26 is suspended in the cylinder by a coil spring 27 of a selected strength and size. One end convolution of the spring 27 is secured on the cap 21 by bolts or like fasteners 28 while the other end convolution of the spring is secured on the piston 26 by bolts or like fasteners 29. Thus it will be seen that the piston 26 is suspended in the cylinder for a yielding movement against the action of the spring. The lower portion of the cylinder contains an oil or some other suitable liquid indicated by the character 30, the height of which is slightly below the normal suspended position of the piston in the cylinder. The height of the liquid in the cylinder can be controlled through the removal of a drain plug 31. The port which the drain plug 31 normally closes may be also employed for injecting liquid into the cylinder through the use of a pump or like device. The cylinder adjacent the bottom is provided with a drain-out plug 32 only employed when it is desired to remove old liquid and any foreign matter that may accumulate within the cylinder.

The piston 26 is provided with a bore 33 opening outwardly through the lower face of the piston and communicating with ports 34 formed in the stem adjacent the upper face of the piston and communicating with the space between the piston and the cap 21. The bore 33 is internally screw threaded and has threaded therein a valve cage 35 including a valve seat 36 and a guard 37 arranged in the ports 34 and acting to limit the movement of the ball off of the seat. The guard is of a skeleton formation to permit liquid to pass freely therethrough to the ports 34 and from the latter back into the lower portion of the cylinder. The seat 36 has a ball valve 38 coacting therewith. The seat 36 is of such a construction that when engaged by the ball valve 38 the latter will be held a selected distance away from the seat for governing the flow of liquid from the upper portion of the cylinder to the lower portion of the cylinder in desired amounts. However, the ball valve 38 may freely move off of its seat during the downward movement of the piston 26 permitting a substantially free flow of liquid from the lower portion of the cylinder to the upper portion of said cylinder or the space above the piston.

The unit described is of a construction employing a liquid, it is to be understood that air may be successfully employed as shown in Figure 6. In this type the lower end of the cylinder is provided with a port 40 placing the lower end of the cylinder in direct communication with the atmosphere. The remaining construction of this unit is identical with the unit employing the liquid except that a different adjustment of the valve seat and ball valve may be necessary for governing the flow of air from the upper portion of the cylinder back to the lower portion of the cylinder during the upward movement of the piston.

In operation, a seat cushion is supported at each corner by recoil checks of the construction described. This arrangement will not interfere with the free removal of the seat cushion and under normal operation it will not require more than approximately two inches of downward motion of the seat frame for the successful operation of this present invention. The weight of the occupants on the seat, causes a downward movement of the piston against the action of the spring 27. The action of the spring 27 is opposite to that of the seat springs 17, that is when the seat springs 17 are depressed, spring 27 is expanded. In normal operation over relatively smooth surfaces or where there are no air bumps or the like the spring 27 will be only slightly expanded and the fluid will not be placed in operation. When, however, a greater upward and downward movement is experienced which is not relieved by other shock absorbing devices on a vehicle as when a vehicle goes over a sudden short bump, causing the seat springs 17 to recoil rapidly tending to throw the occupants from the seat, spring 27 expands thus absorbing a great part of the movement increasing the riding comfort of the occupants. As the spring 27 expands the fluid passes from the lower part of the cylinder into the upper part by way of the ball valve and through the ports 34 with little or no resistance. The recoil of the spring 27 forces the fluid from the upper part of the cylinder into the lower part by way of the valve. This downward flow of the liquid is retarded which prevents the spring 27 from recoiling violently and the shock which otherwise would be transmitted to the occupant is thus greatly reduced.

The recoil checks as described in detail and shown in the drawings will be self-lubricating and will require practically no attention except at great intervals when it is necessary to check the level of the fluid and replenish it if needed.

Further it will be noted that the invention is featured by accessibility of all parts. The cap 21 may be easily detached from the cylinder 18 so that the piston and spring as well as the valve can be removed as a single unit, permitting adjustments or repairs to be made to the valve or the spring. Further, the packing of the packing gland can be easily adjusted through the cap 21 or removed and replaced when necessary. Through the use of the recoil checks the added advantage of spring operation opposite to that of seat springs is had and, therefore, in ordinary operation gives compensating action when seat springs are slightly depressed, assuring maximum comfort to the occupants. The size and strength of the recoil checks will necessarily vary with the loads to be carried. Also the size and tension of the spring 27 can be varied to meet required loads.

It is believed that the foregoing description, when taken in connection with the drawings will fully set forth the construction and advantages of this invention to those skilled in the art to which such a device relates, so that further detailed description will not be required.

Having thus described the invention, I claim:

A seat recoil check comprising a cylinder fully open at its upper end, means for securing said cylinder on a vehicle, a cap removably mounted on the upper end of the cylinder, a stem slidable in said cap, a packing gland for the stem and carried by the cap, detachable means on the stem for securing the latter on a seat frame, a piston formed on the stem and operating in the cylinder, means for permitting liquid to be placed in the cylinder below the piston to a selected level, a coil spring secured on the cap and on the piston for yieldably supporting the latter normally in a position slightly above the surface of the liquid, said piston having a bore extending therethrough and into the stem and opening outwardly through opposite sides of the stem for connecting the upper and lower portions of the cylinder, a cage including a valve seat threaded in the bore and removable therefrom from the lower side of the piston, a ball type valve mounted in said cage and coacting with the seat to permit a substantially free flow of liquid through the bore of the piston from the lower portion of the cylinder to the upper portion of said cylinder during the downward movement of the piston and to retard the flow of the liquid from the upper portion of the cylinder to the lower portion of said cylinder during the upward movement of the piston for checking the rebound of the spring.

EDMOND N. YANTES.